United States Patent
Hoymann et al.

(10) Patent No.: US 9,295,038 B2
(45) Date of Patent: Mar. 22, 2016

(54) CONTROL CHANNEL CONFIGURATION IN A WIRELESS COMMUNICATIONS SYSTEM

(75) Inventors: Christian Hoymann, Aachen (DE); Stefan Parkvall, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 171 days.

(21) Appl. No.: 13/885,413

(22) PCT Filed: Nov. 16, 2011

(86) PCT No.: PCT/EP2011/005770
§ 371 (c)(1),
(2), (4) Date: May 15, 2013

(87) PCT Pub. No.: WO2012/065727
PCT Pub. Date: May 24, 2012

(65) Prior Publication Data
US 2013/0230015 A1     Sep. 5, 2013

Related U.S. Application Data

(60) Provisional application No. 61/414,254, filed on Nov. 16, 2010, provisional application No. 61/542,461, filed on Oct. 3, 2011.

(51) Int. Cl.
*H04W 72/04* (2009.01)
*H04W 72/12* (2009.01)
*H04L 5/00* (2006.01)

(52) U.S. Cl.
CPC ......... *H04W 72/0406* (2013.01); *H04L 5/0053* (2013.01); *H04W 72/1278* (2013.01)

(58) Field of Classification Search
USPC .................. 370/315, 328–329; 455/452.2
See application file for complete search history.

(56) References Cited

U.S. PATENT DOCUMENTS

2007/0259672 A1* 11/2007 Heo ............... H04W 72/042
                                              455/452.2
2009/0022098 A1*  1/2009 Novak ............... H04L 1/14
                                              370/329

(Continued)

FOREIGN PATENT DOCUMENTS

EP          2026625 A2    2/2009
WO      2009002097 A1   12/2008

(Continued)

OTHER PUBLICATIONS

3rd Generation Partnership Project. 3GPP TS 36.213 V8.8.0 (Sep. 2009). 3rd Generation Partnership Project; Technical Specification Group Radio Access Network; Evolved Universal Terrestrial Radio Access (E-UTRA); Physical layer procedures (Release 8). Sep. 2009, pp. 22, pp. 64-66.

*Primary Examiner* — Edan Orgad
*Assistant Examiner* — Steven Willmore
(74) *Attorney, Agent, or Firm* — Murphy, Bilak & Homiller, PLLC (57) ABSTRACT

The present invention is directed to methods in a wireless communication network for allocating resource elements of a transmission resource to a control channel. The invention also relates to different nodes of a wireless communication network. The transmission resource comprises a first number of resource blocks each comprising one or a plurality of subsets of resource elements. One method in a control node comprises the steps: obtaining a bitmap for configuration of the transmission resource, wherein the bitmap is adapted to identify at least one subset of resource elements within the transmission resource (S1); allocating the at least one identified subset of resource elements to the control channel (S2); and transmitting control data on the at least one subset of resource elements allocated to the control channel to a receiving node (S3).

20 Claims, 10 Drawing Sheets

(56) References Cited

U.S. PATENT DOCUMENTS

| | | | |
|---|---|---|---|
| 2009/0232075 A1* | 9/2009 | Konta | H04L 5/0096 370/329 |
| 2010/0158142 A1* | 6/2010 | Yu | H04B 7/026 375/260 |
| 2010/0167772 A1* | 7/2010 | Fukui | H04L 5/0037 455/509 |
| 2011/0051672 A1* | 3/2011 | Lee | H04L 5/0007 370/329 |
| 2011/0164550 A1* | 7/2011 | Chen | H04W 72/042 370/315 |
| 2011/0267978 A1* | 11/2011 | Etemad | H04L 5/003 370/254 |
| 2012/0147846 A1* | 6/2012 | Ho | H04W 72/042 370/330 |
| 2013/0010685 A1* | 1/2013 | Kim | H03M 13/271 370/315 |

FOREIGN PATENT DOCUMENTS

| | | |
|---|---|---|
| WO | 2010018945 A2 | 2/2010 |
| WO | 2010090497 A2 | 8/2010 |
| WO | 2010117225 A2 | 10/2010 |
| WO | 2010118382 A1 | 10/2010 |

* cited by examiner

CONTROL CHANNEL CONFIGURATION IN A WIRELESS COMMUNICATIONS SYSTEM

TECHNICAL FIELD

The present invention relates to methods in a wireless communication network for configuring a control channel. The invention further relates to nodes for a wireless communication network adapted to configure a control channel and to computer program products implementing the methods.

BACKGROUND

In wireless communications control channels are used to transfer control data from one node to another. Within 3GPP (3rd Generation Partnership Project) different control channels have already been specified.

Figure 1:
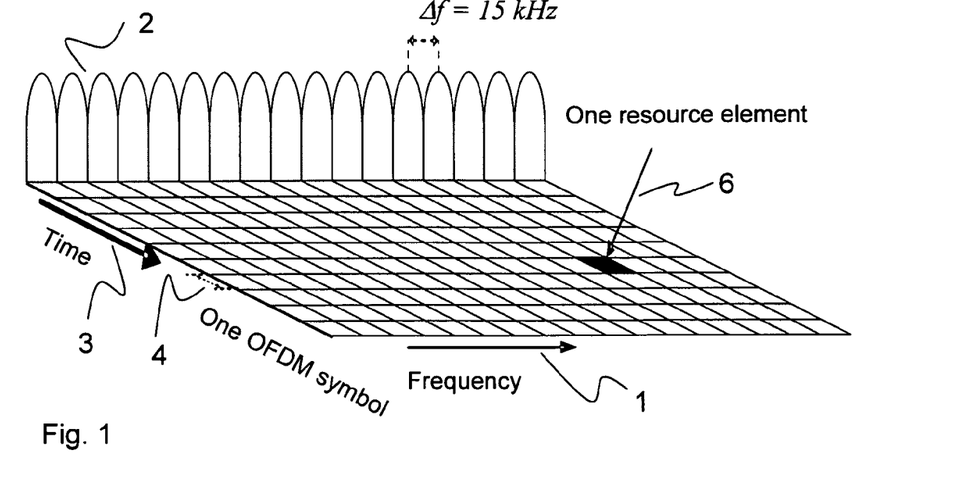
FIG. 1 shows a basic LTE downlink physical transmission resource.

Downlink transmissions in 3GPP LTE (Long Term Evolution) or in E-UTRAN (evolved Universal Terrestrial Radio Access Network) are based on Orthogonal Frequency Division Multiplex (OFDM). The basic LTE downlink physical resource can thus be seen as a time-frequency grid as illustrated in FIG. 1, where each resource element (RE) corresponds to one OFDM subcarrier during one OFDM symbol interval.

In the time domain, with respect to LTE, transmissions are structured into frames and subframes. Each frame of length $T_f=10$ ms consists of ten equally-sized subframes of length $T_{subframe}=1$ ms. Each subframe, in turn, consists of two equally-sized slots of length $T_{slot}=0.5$ ms. In frequency domain, the smallest addressable unit is a Resource block (RBs), which consists of 12 contiguous subcarriers during one slot.

In LTE data transmissions to/from a receiving node such as a User Equipment (UE) or a Relay Node (RN) are under strict control of the scheduler located in a control node such as an eNodeB (eNB) or a relay node (RN). Control signaling or control data is scheduled on a control channel and the control data is sent on the control channel from the control node to the receiving node (e.g. UE) to inform the receiving node about the scheduling decisions.

Downlink scheduling assignments and uplink scheduling grants are examples of control data transmitted via a (or as a) control channel. Downlink scheduling assignments are used to indicate to a UE that it should receive data from an eNB (or RN). A downlink scheduling assignment may assign certain resources for the transmission in the downlink, i.e. from a control node (e.g. a base station, an eNB or a RN) to a receiving node (e.g. a terminal or a UE). Uplink scheduling grants inform the receiving node (UE) that it should transmit in the uplink, e.g. a couple of subframes later. An uplink scheduling grant may grant certain resources for a transmission in the uplink, i.e. from a receiving node (e.g. a terminal or a UE) to a control node (e.g. a base station).

As an example, the downlink scheduling assignments (and uplink scheduling grants) point to a set of RBs or resource blocks groups (RBGs) in the frequency domain and refer to one subframe in the time domain, i.e., the assignments/grants may operate on pairs of resource block in the time domain.

Figure 2:
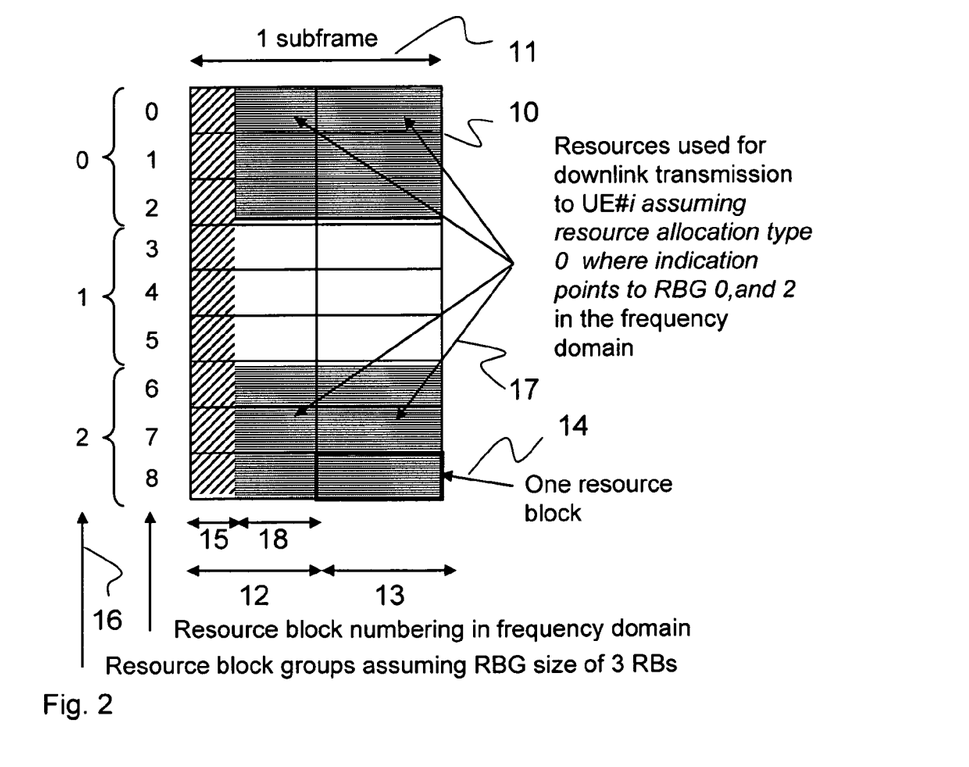
FIG. 2 shows examples of scheduling decisions indicating resource blocks on which a receiving node (e.g. a UE) should receive data.

Resource allocation can be done using different types of allocation. Type 0 allows allocating contiguous or non-contiguous resources in units of RBGs. Type 1 allows allocating non-contiguous RBs from a restricted set of RBs. Type 1 allows allocating one block of contiguous RBs. An example of resource allocation type 0 with RBG size of 3 RBs is shown in FIG. 2. In this example, the slopingly hatched parts in each frequency domain block 0 to 8 contain control data, whereas the horizontally hatched parts contain payload data. The depicted subframe is divided into a first slot and a second slot. E.G. in 3GPP TS 36.213 V8.8.0, section 7.1.6 three types of resource allocation are discussed.

Relaying is considered for LTE-Advanced (LTE release-10) as a tool to improve e.g. the coverage of high data rates, group mobility, temporary network deployment, the cell-edge throughput and/or to provide coverage in new areas. The relay node (RN) is wirelessly connected to the radio-access network via a donor cell controlled by a donor eNodeB (eNB). The RN transmits data to/from UEs controlled by the RN using the same air interface as an eNB, i.e. from a UE perspective there is no difference between cells controlled by a RN and an eNB.

LTE-Advanced will support a new control channel, the R-PDCCH. An R-PDCCH carrying downlink assignment occurs in the first slot and it occupies OFDM symbols numbered 3, 4, 5, and 6. An R-PDCCH carrying uplink grants is transmitted in the second slot of a subframe; under certain timing conditions the last OFDM symbol of the second slot cannot be used.

Multiple R-PDCCHs can be transmitted and similar to the LTE 3GPP Release 8 PDCCH the concept of a search space is applied: a search space is a set of locations in the time-frequency grid, where the relay node expects an R-PDCCH transmission. The Release 8 control region (i.e. the region, wherein the search space is determined) spans the whole freq. domain and the search space is determined taking all RBs into account. The R-PDCCH control region will typically not occupy the full system bandwidth so that the remaining resources can be used for transmission of data to UE and/or RNs. The region is configured by the eNB using the same resource allocation types as used for the allocation of Release 8 PDSCH (Physical Downlink Shared Channel). In general a search space is space in a transmission resource in which a receiving node (e.g. Relay node or UE) expects control data.

A further description of the Release-8 PDCCH can be found in 3GPP 36.213 V8.8.0 section 9.1 "UE procedures for determining physical downlink control channel assignment." The PDCCH control region is defined by the value transmitted in PCFICH, hence it spans 1 to 4 OFDM symbols. The PDCCH search space is a UE-specific subset of REs within the control region.

The PDCCH control region is defined by the value transmitted in PCFICH (Physical Control Format Indicator Channel), hence it spans 1 to 4 OFDM symbols. The PDCCH search space is a UE-specific subset of REs within the control region.

The different resource allocation types have been design to minimize signaling load on the PDCCH and at the same time maximizing flexibility of PDSCH resource allocation. As a consequence, the three different types represent a trade-off between those two aspects.

The resource allocation is currently restricted to using type 0, 1 or 2. For instance, with resource allocation type 0 and a RBG size of 3, half of the R-PDCCH candidate positions of aggregation level 2 are not suitable for frequency selective scheduling. It is therefore desirable to further optimize the set up of a search space.

The R-PDCCH is one example of a control channel to which the subsequently presented configurations can be applied. The subsequently discussed configurations may also be applied to an ePDCCH (enhanced Physical Downlink Control Channel), which is another example of a control channel on which it is subsequently focused. The general concept may be applied to further control channels besides the ones explicitly mentioned.

SUMMARY

According to one aspect of the invention a method in a control node of a wireless communication network for allocating resource elements of a transmission resource to a control channel is provided. The transmission resource comprises a first number of resource blocks each comprising one or a plurality of subsets of resource elements. The method comprises the following steps: Obtaining a bitmap for configuration of the transmission resource, wherein the bitmap is adapted to identify at least one subset of resource elements within the transmission resource; Allocating the at least one identified subset of resource elements to the control channel; and Transmitting control data on the at least one subset of resource elements allocated to the control channel to a receiving node.

According to one aspect of the invention a method in a receiving node of a wireless communication network for allocating resource elements of a transmission resource to a control channel is provided. The transmission resource comprises a first number of resource blocks each comprising one or a plurality of subsets of resource elements. The method comprises the steps: Obtaining a bitmap for configuration of the transmission resource, wherein the bitmap is adapted to identify at least one subset of resource elements within the transmission resource; Allocating the at least one identified subset of resource elements to the control channel; and Searching for control data on the at least one subset of resource elements allocated to the control channel.

According to one aspect of the invention a control node for a wireless communication network and for allocating resource elements of a transmission resource to a control channel is provided. The transmission resource comprises a first number of resource blocks each comprising one or a plurality of subsets of resource elements. The control node comprises: A scheduler entity for obtaining a bitmap for configuration of the transmission resource, wherein the bitmap is adapted to identify at least one subset of resource elements within the transmission resource and for allocating the at least one identified subset of resource elements to the control channel; and a transmitter for transmitting control data on the at least one subset of resource elements allocated to the control channel to a receiving node.

According to one aspect of the invention a receiving node for a wireless communication network and for allocating resource elements of a transmission resource to a control channel is provided. The transmission resource comprises a first number of resource blocks each comprising one or a plurality of subsets of resource elements. The receiving node comprises a processor entity for obtaining a bitmap for configuration of the transmission resource, wherein the bitmap is adapted to identify at least one subset of resource elements within the transmission resource, for allocating the at least one identified subset of resource elements to the control channel, and for searching for control data on the at least one subset of resource elements allocated to the control channel.

According to one aspect of the invention a computer program product is provided comprising software code portions for performing the methods in a control node or a receiving node of a wireless communication network for allocating resource elements of a transmission resource to a control channel.

Further embodiments of the inventions are defined in the dependent claims and in the detailed description.

DETAILED DESCRIPTION

In order to make the configuration of the R-PDCCH control region more flexible the proposed resource allocation scheme is not tight to the Release-8 PDSCH resource allocation types 0, 1, or 2.

According to one aspect of particular embodiments a method for allocating resource elements (or a resource unit) for control signaling is provided. The method comprises: providing a number of resource elements (or resource units) being individually addressable; and allocating a subset of the number of resource elements (or resource units) for control signaling.

Resource elements (or resource units) may be defined in respect of a time-frequency grid. An individual resource element (or resource unit) can, for example, be used for transmitting payload data or control data. The method is particularly intended for wireless communication networks. The allocated subset of resource elements (or resource units) may define the R-PDCCH control region. For example, a resource block in the discussed time-frequency grid is an example of a resource element (resource unit) to be allocated. Control signaling may particularly comprise the control channel R-PDCCH. Each resource element (or resource unit) is individually addressable.

The addressing may be preferably performed by using a bitmap. A bitmap may be used to address and/or select and/or allocate the subset of the number resource elements (or resource units) for control signaling.

For each of the total number of resource elements (or resource units) preferably one bit is used to define whether the resource element (resource unit) is used for control signaling (or not). Thus, the size of the bitmap corresponds to the total number of resource elements (or resource units).

In a particular embodiment, a resource element (resource unit) comprises more than one resource block, e.g. two, four, or eight resource blocks. In this way the size of the bitmap is correspondingly decreased, as only the resource elements (resource units) are individually addressed instead of the resource blocks.

In a particular embodiment, the number of resource blocks per resource element (resource unit) corresponds to an aggregation level. An aggregation level defines the number of resource blocks jointly used for control signaling.

The method may run in an eNodeB. The eNodeB may transmit the control signaling in the allocated resource elements (resource units) for control signaling to a relay node. The eNodeB may transmit the addresses of the allocated resource elements (resource units) to the relay node.

According to one aspect of particular embodiments, a control node for a wireless network, e.g. an eNodeB, is provided, wherein the control node is adapted to perform the method for allocating resource elements (resource units) for control signaling.

According to one aspect of particular embodiments, a relay node is provided, which is adapted to receive control signaling in the allocated resource elements (resource units) from the eNodeB.

According to one aspect of particular embodiments, a method for operating a relay node is provided comprising the step: receiving control signaling in resource elements (resource units) selected according to the method for allocating resource elements (resource units) for control signaling.

According to one aspect of particular embodiments a computer program product is provided, comprising software code portions for performing the steps of the method for allocating resource elements (resource units) for control signaling. Further aspects and details on proposed solutions are found below.

FIG. 1 shows a basic LTE downlink physical transmission resource. On a frequency axis 1, the frequency is divided in several subcarriers 2. A time axis 3 is divided into several OFDM symbol durations 4. A resource element 6 is defined by a certain subcarrier and a certain OFDM symbol index in the time domain. The LTE downlink physical resource is further discussed in Section 16.2.1 of the book "3G Evolution" by Dahlman et al, first edition 2007.

FIG. 2 describes a scheduling decision on the basis of a transmission resource 10, which comprises in the time domain one subframe 11 consisting of a first slot 12 and a second slot 13. In the frequency domain a bandwidth is divided into 9 blocks numbered from 0 to 8. Each block may comprise a number of subcarriers, e.g. 12 subcarriers. Frequency block 8 and second slot 13 define one resource block 14. Resource block 14 comprises several resource elements, the number depends on the number of subcarriers per block in the frequency domain and the number of OFDM symbols in the second slot 13. In case of 12 subcarriers and 14 OFDM symbols, the resource block 14 comprises 168 resource elements. A first part 15 of the first slot 12 may generally be used for control data. Resource blocks may be grouped in the frequency domain by groups 16, which are numbered from 0 to 2 in this example. An indication of resource allocation type 0, and an indication to resource block groups 0 and 2 for a receiving UE #i means that UE #i expects data in the horizontally hatched parts 17 of the transmission resource 10. That is the resources for payload data to UE #i are identified by resource block index 0, 1, 2 and 6, 7, 8 in frequency domain and by a second part 18 of first slot 12 and the second slot 13 in time domain.

Figure 3:
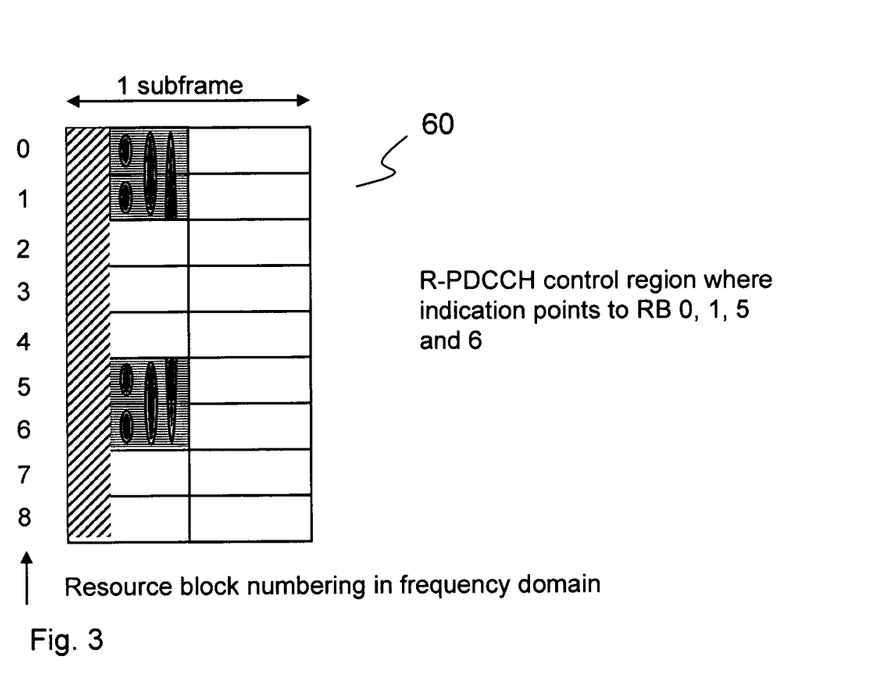
FIG. 3 shows an example R-PDCCH configuration indicating resource blocks upon which the RN should determine the R-PDCCH search space.

Maximum flexibility can be reached by configuring the R-PDCCH control region without any restriction. Since the smallest addressable unit in the frequency domain is a RB, each RB should be individually configurable. In order to do so, bitmap can be used. The size of the bitmap equals the number of RBs in the system bandwidth. A "1" in that bitmap configures the corresponding RB for the R-PDCCH control region, while a "0" does not. Like that each RB can be configured individually. An example configuration is shown in FIG. 3 depicts a transmission resource 60 that is structured in a similar way as transmission resource 10 of FIG. 2. In FIG. 3, an indication points to RBs 0, 1, 5 and 6. Such a configuration would not be possible using resource allocation types 0, 1, or 2. In addition R-PDCCH candidate positions in the time-frequency grid are highlighted for aggregation level 1, 2 and 4. The aggregation level determines the number of resource units an R-PDCCH spans across.

Aggregation level 1 means that the control channel spans over one resource block, indicated by the four oval shaped markers at the very left. Aggregation level 2 means that the control channel spans over two resource blocks, indicated by the two oval shaped markers in the middle. Aggregation level 4 means that the control channel spans over four resource blocks, indicated by the single oval shaped marker at the very right in FIG. 3.

In order to shrink the bitmap, one could indicate to blocks of RBs, where the block size is configured as well. Like that the eNB could configure the block size to 2 RBs and allocate 100 RBs with a 50-bit bitmap. Preferably, the block size should be a factor in the aggregation levels used for the R-PDCCH, i.e. 1, 2, 4 or 8 RBs. Note that the "RB block size" for the R-PDCCH is set independently of the "Resource Block Group size" (RBG size) for the PDSCH. This is done in order to avoid the problems mentioned in the example above when the RBG size is 3 which is not a factor in 1, 2, 4 or 8.

As a further embodiment for R-PDCCH, which is not interleaved with other R-PDCCH intended for different RNs, a bitmap can be used to individually configure the control region per aggregation level. This would involve as many bitmaps as R-PDCCH aggregation levels are to be configured. In LTE-Advanced 4 aggregation levels of 1, 2, 4 and 8 RBs are discussed.

Figure 4:
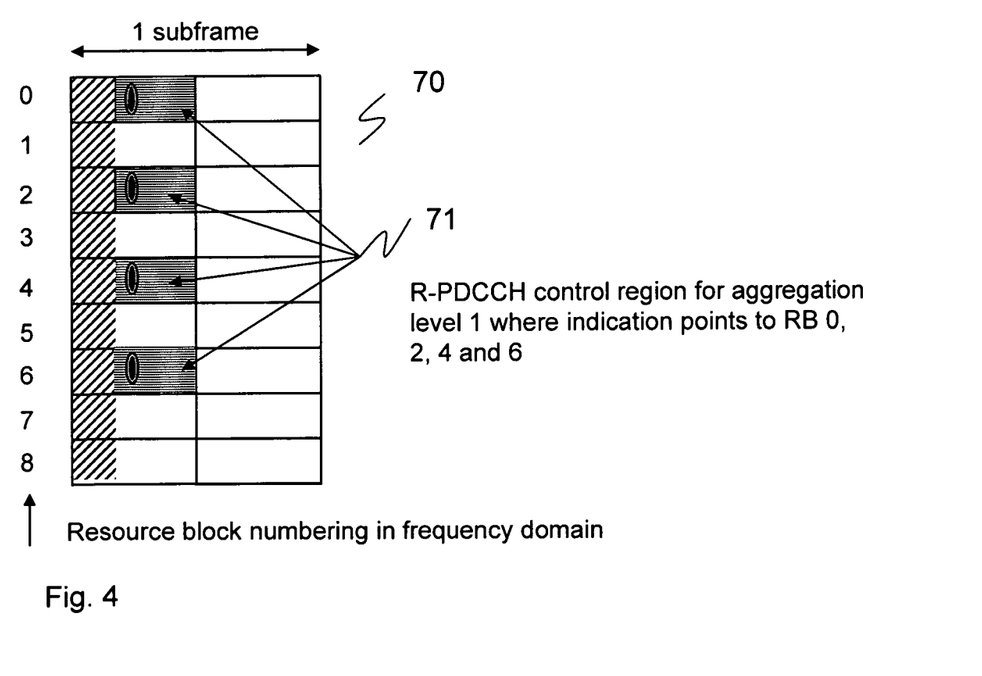
FIG. 4 shows an R-PDCCH control region for an aggregation level 1.

FIG. 4 depicts a transmission resource 70 that is structured in a similar way as transmission resource 10 of FIG. 2. FIG. 4 shows an R-PDCCH control region 71 for aggregation level 1, where indication points to RB 0, 2, 4 and 6.

Figure 5:
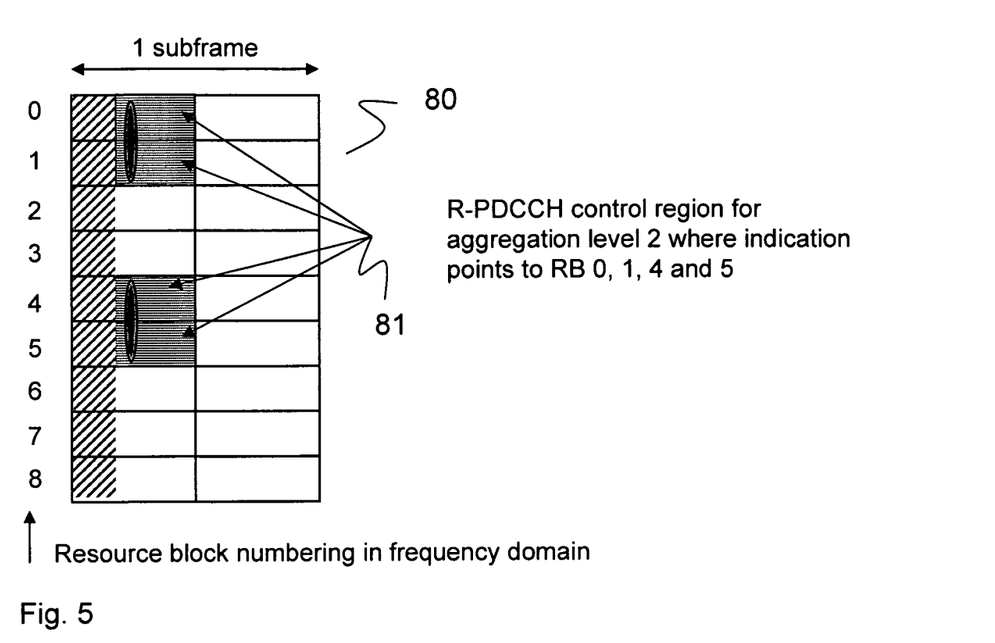
FIG. 5 shows an R-PDCCH control region for an aggregation level 2.

FIG. 5 depicts a transmission resource 80 that is structured in a similar way as transmission resource 10 of FIG. 2. FIG. 5 shows an R-PDCCH control region 81 for aggregation level 2, where indication points to RB 0, 1, 4 and 5.

Figure 6:
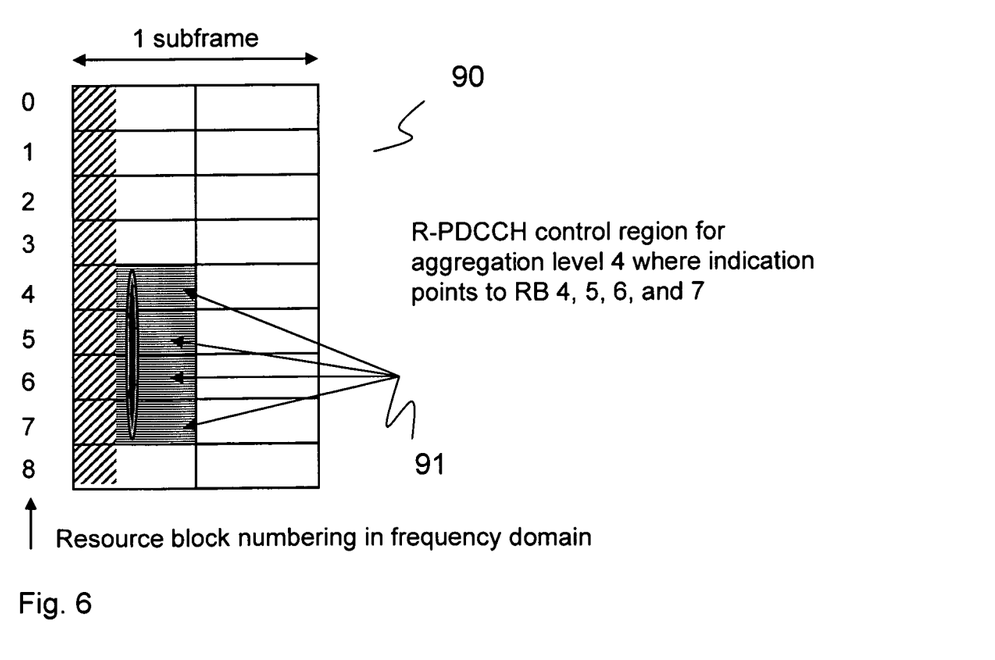
FIG. 6 shows an R-PDCCH control region for an aggregation level 4.

FIG. 6 depicts a transmission resource 90 that is structured in a similar way as transmission resource 10 of FIG. 2. FIG. 6 shows an R-PDCCH control region 91 for aggregation level 4, where indication points to RB 4, 5, 6 and 7.

With an aggregation-level specific configuration the bitmap could be shortened by allocating blocks of RBs where the size of the block equals the aggregation level. This would still maximize frequency selectivity but shorten the bitmap. For instance, instead of a 100-bit bitmap individually allocating 100 RBs, the bitmap for aggregation level 4 can consist of 25 bits only.

Another possibility to reduce the size of the bitmap (applicable either per aggregation level or to a common signalling valid for all aggregation levels) is to combine it with a starting position. For example, instead of 100 bits one could use 50 bits together with a starting RB that locates the 50 RBs pointed to by the bitmap somewhere in the 100 RB bandwidth. This reduces the bitmap size at the cost of reduced flexibility. Another possibility could be to let the reduced bitmap point to every second or every fourth RB, etc, thereby reducing the size with a factor of two or four. The two methods could also be combined, e.g. two small bitmaps, each with a starting point in the overall bandwidth. In this case, restrictions on the starting point can be exploited to further reduce the number of bits, e.g. by defining the starting position of the second bitmap relative to the first bitmap, or to relate the location of the second bitmap to the end of the overall bandwidth (i.e. not relative to the first RB, number 0, but to the last RB, number 99, in case of a 100 RB system). This approach can be generalized to more than two groups of bitmaps.

The above section describes the configuration for the R-PDCCH carrying downlink assignments in the first slot. It should be understood, that the same configuration(s) can be used for the R-PDCCH carrying UL grants in the second slot.

Unlike the PDSCH resource allocation, the configuration of the R-PDCCH control region is not dynamic on a subframe-by-subframe basis. It is semi-statically configured by RRC (Radio Resource Control) and it is suppose to be reconfigured rarely, e.g. when a new RN will be deployed in a cell. Hence the signaling load is not an issue.

Figure 7:
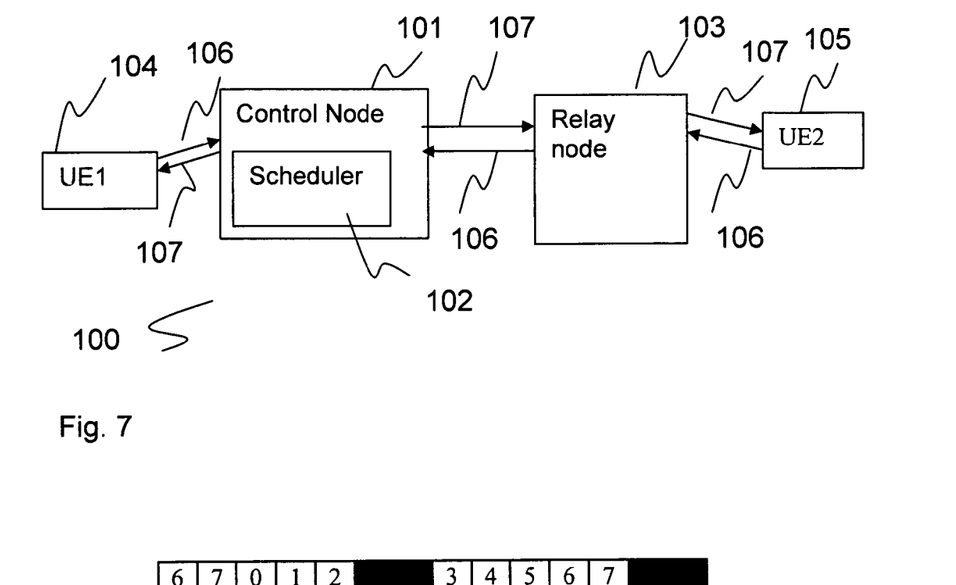
FIG. 7 shows an example of a radio communication system.

FIG. 7 shows—as an example—a general setup of a system in which particular embodiments can be implemented. FIG. 7 shows a radio communication system 100 comprising a control node (eNB) 101 with a scheduler 102, a relay node 103 (RN) and a first user equipment 104 (UE 1) and a second user equipment 105 (UE 2). Each of the control node 101, the relay node 103, the first user equipment 104 and the second user equipment 105 comprises a transmitter and a receiver. The control node, the relay node and the user equipment are connected via a wireless interface. The arrows indicate possible uplink communications 106 and downlink communications 107.

The proposed scheme allows maximum flexibility when configuring RBs for the R-PDCCH control region. By that the R-PDCCH control region can be configured to meet different goals, such as frequency diversity or gains from frequency selective scheduling.

For 3GPP LTE Release-11 an enhanced downlink control channel is being discussed. In the following it is referred to as ePDCCH (enhanced Physical Downlink Control Channel). This control channel is used to transmit control data/control signaling. Investigations are motivated by an email discussion within 3GPP RAN1 "[66-04] Downlink control signalling enhancements"]:

Firstly, the PDCCH (Physical Downlink Control Channel) does not provide a high degree in flexibility in frequency domain for control channel interference coordination between cells or any potential for frequency selective scheduling gain of the control channel. Secondly, the PDCCH overhead does not scale well with the number of scheduled UEs. Thirdly, the growing use of PDSCH (Physical Downlink Shared Channel) transmission in MBSFN (Multicast/Broadcast Single Frequency Network) subframes is limited by the fact that only two OFDM symbols can be used for PDCCH. Fourthly, the PDCCH cannot leverage advantage of multiple antennas at the eNB through beamforming gain to make the control channel performance scale with the number of transmit antennas. Fifthly, the intra-cell spatial reuse of control channel resources which is useful for novel deployments and antenna structures as the shared cell scenario is not possible with the PDCCH.

For the R-PDCCH the control region is a set of PRB (Physical Resource Block) pairs configured by higher layers. Again the R-PDCCH search space is a RN-specific subset of RBs/REs within the control region. The definition is captured in 3GPP TS 36.216 sections 7.4.2 and 7.4.3 "Relay node procedure for determining relay physical downlink control channel assignment with/without cross-interleaving."

LTE-Advanced supports a relay-specific control channel, the R-PDCCH (Relay-Physical Downlink Control Channel). In this system, an R-PDCCH carrying downlink assignment occurs in the first slot and it occupies OFDM symbols numbered 3, 4, 5, and 6. An R-PDCCH carrying uplink grants is transmitted in the second slot of a subframe; under certain timing conditions the last OFDM symbol of the second slot cannot be used.

Similar to the R-PDCCH, multiple ePDCCHs can be transmitted in a subframe and similar to the LTE 3GPP Release 8 PDCCH the concept of a search space will be applied: a search space is a set of locations in the time-frequency grid, where the receiving node of the control channel (e.g. a UE) can expect an ePDCCH transmission. The 3GPP Release 8 control region, i.e. the region, wherein the search space is determined, spans the whole freq. domain and the search space is determined taking all RBs into account. Similar to the R-PDCCH, the ePDCCH control region will typically not occupy the full system bandwidth so that the remaining resources can be used for other kinds of transmission, e.g. payload data to a UE. The R-PDCCH control region, i.e., the set of configured RBs in which the search space is determined, is configured by the eNB using the same resource allocation types as used for the allocation of 3GPP Release-8 PDSCH.

For the R-PDCCH, the smallest unit to configure is an RB (or a RB pair) since the smallest R-PDCCH, i.e. a DM-RS (Demodulation Reference Signal) based R-PDCCH of aggregation level 1 occupies one slot of an RB. For the ePDCCH a smaller granularity will be useful, hence one want to configure units smaller than one RB. In the following we refer to those units as mini control channel elements (mCCE) or subsets of resource elements. Multiple mCCEs can be transmitted in an RB pair.

Figure 8:
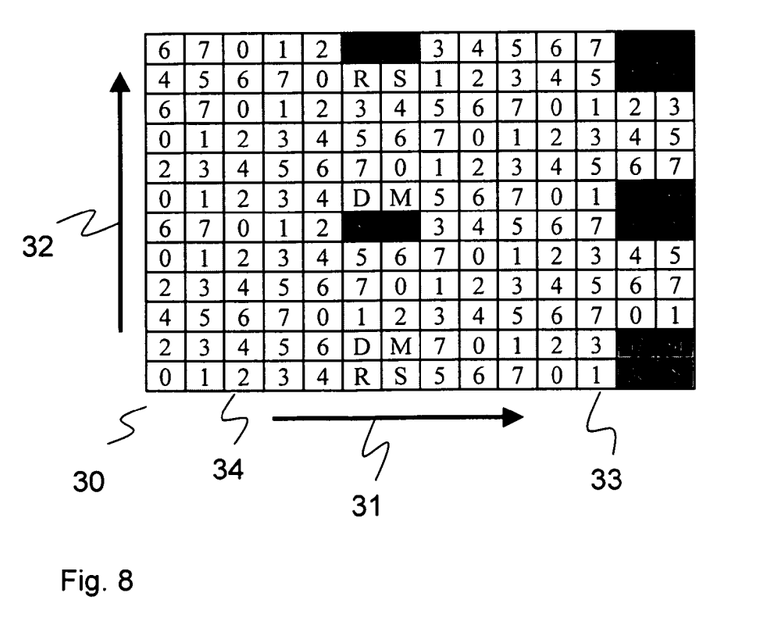
FIG. 8 shows an example mapping of resource elements of a resource block to subsets of resource elements (mCCEs).

FIG. 8 shows an example mapping of 8 mCCEs to REs of an RB, where one mCCE occupies ⅛ of the available REs per subframe, i.e. 18 REs. REs unavailable for ePDCCH transmissions are for instance REs used for reference signals (RSs) such as UE-specific demodulation RS (DMRS). Using time-first mapping REs occupied by one mCCEs can be distributed across the subframe. In FIG. 8 the grey elements are occupied by the mCCE numbered #1. Other mappings, e.g. frequency first are possible as well.

The configuration of the ePDCCH search space is not yet defined. FIG. 8 shows in the vertical direction 12 subcarriers and the horizontal direction (time axis) 14 OFDM symbols. The depicted block can be seen as one resource block pair, which comprises 12*14=168 resource elements. A subset of these resource elements may be referred to as mCCE.

The different PDCCH resource allocation types, i.e. types 0, 1, and 2, have been designed to minimize signaling load on the PDCCH and at the same time maximizing flexibility of PDSCH (Physical Downlink Shared Channel) resource allocation. As a consequence, the three different types represent a trade-off between those two aspects.

One aim is to set up a search space in an optimized way. With respect to the ePDCCH, configuring RBs only may not be optimal when an ePDCCH search space will span over one or more mCCEs and not over one or more RBs. It is generally an object to obviate at least some of the above described disadvantages.

In order to make the configuration of the control region more flexible a more powerful resource allocation scheme is proposed, which is not tight to the 3GPP Release-8 PDSCH resource allocation types 0, 1, or 2.

The invention generally refers to methods and nodes in a (wireless) communication system/network. In particular, it relates to methods and nodes in LTE based communication networks, but it is not restricted to these particular types. In fact, any communication based on a transmission resource structured in the below described way may apply the invention. A transmission resource comprises a first number of resource blocks each comprising a second number of subsets of resource elements.

According to one aspect of the invention a method for allocating resource elements to a control channel (or control data or control signaling or ePDCCH) is provided. A transmission resource comprises (a first number of) resource blocks comprising each (a second number of) subsets of resource elements. The method comprises: allocate (or configure) at least one of the subsets of resource elements to (as part of) the control channel.

Figure 9:
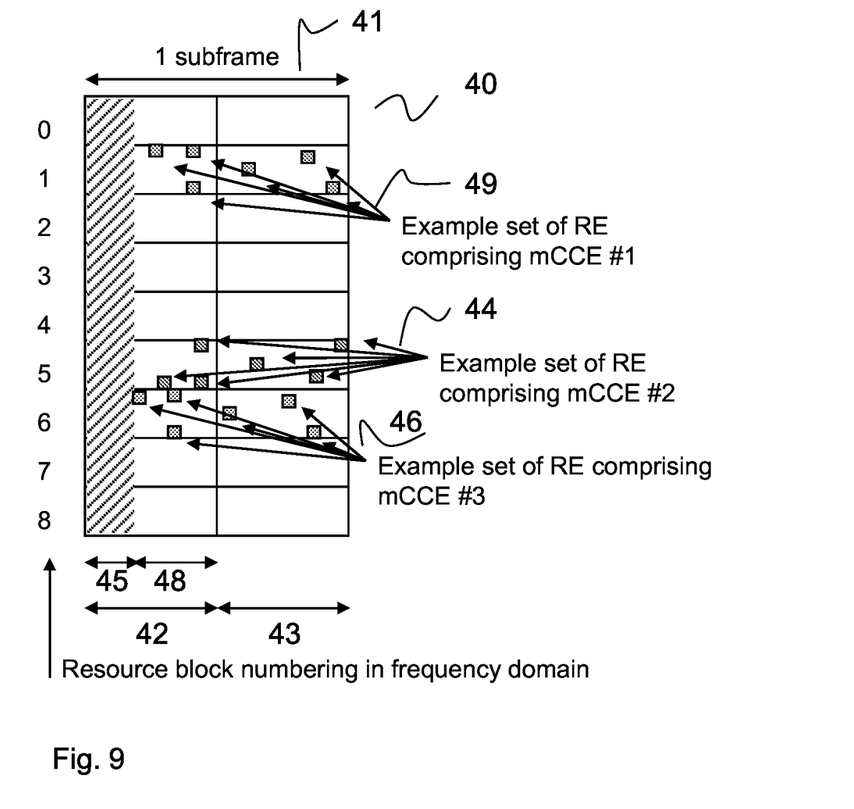
FIG. 9 to FIG. 13 show different ePDCCH configuration indicating mCCEs upon which the UE should determine the ePDCCH search space.

Resource elements may be defined in respect of a time-frequency grid. An individual resource element can, for example, be used for transmitting payload data or control data. An exemplary structure of the transmission resource is shown in FIG. 9. Allocated subsets of resource elements may define an ePDCCH control region. For example, a mCCE, a pre-defined set of REs of the discussed time-frequency grid is an example of a subset of resource elements to be allocated. Each subset of resource elements may individually be configurable as part of the control channel.

The configuration (allocation of resource elements to the control channel) may be preferably performed by using a bitmap. It is preferred that the bitmap is defined by a maximum size and a starting position. This concept is further elaborated below.

It is preferred that the bitmap relates a separate bit to each subset of resource elements in the transmission resource. The separate bit indicates whether the related subset of resource elements is to be allocated to the control channel.

In other words, for each of the subsets of resource elements within the transmission resource preferably one bit is used to define whether the particular subset of resource elements is used for the control channel (or not). In this case, the size of the bitmap corresponds to the total number of subsets of resource elements in the transmission resource, which is the first number of resource blocks times the second number of subsets of resource elements (e.g. mCCEs) per resource block.

It is preferred that the bitmap relates a separate bit to a block of subsets of resource elements in the transmission resource. The separate bit indicates whether the related block of subsets of resource elements is to be allocated to the control channel.

A block of subsets comprises two or more subsets. This block size may be set to an aggregation level. By referring to blocks of subsets, the required size of the bitmap can be reduced.

It is preferred that the bitmap relates a separate bit to each of the resource blocks within the transmission resource indicating whether a control channel is to be allocated within the related resource block.

It is further preferred that the bitmap relates a separate bit to each of the subsets of resource elements within one resource block, indicating whether a subset of resource elements is to be allocated as control channel within the indicated resource block. In this way in the selected (indicated) resource blocks corresponding subsets are allocated to the control channel.

This allows for a reduced size of the bitmap at the cost of reduced flexibility in allocating control channels, i.e. in the selected resource blocks, corresponding subsets of resource elements are allocated to the control channel.

Alternatively to assigning a first number of bits to the resource blocks and/or a second number of bits to the subsets, an (at least one) index number of a resource block to be selected and/or an (at least one) index of the subset within the selected resource block may be used to indicate the subset to be allocated to the control channel.

The bitmap can be decreased when the bitmap only indicates the resource blocks. The subset (mCCE) within each resource block is configured separately. Likewise the bitmap may only indicate the number of subsets (mCCEs) per resource block while the resource block number is configured separately.

It is preferred that a block of subsets comprises more than one subset of resource elements (mCCE), e.g. two, four, or eight. In this way the size of the bitmap is correspondingly decreased, as only the blocks of subsets are individually addressed instead of the subsets of resource elements (mCCEs). It is preferred that the number of subsets of resource elements put in one block of subsets (e.g. the number of mCCEs per block of subsets) corresponds to an aggregation level. An aggregation level defines the number of subsets (mCCEs) jointly used as control channel (for transmitting control data).

The above methods may run in a control node, (eNodeB node, base station, relay node, second UE e.g. in case of device-to-device communication, control node of a wireless communication network). The control node may transmit the control channel (control signaling, control data) in the allocated resource elements to a receiving node (UE, terminal, or a relay node). The control node may transmit the bitmap to the receiving node (UE, terminal, or relay node).

According to one aspect, a control node (particularly for a wireless network, e.g. an eNodeB, a relay node or a UE) is provided, wherein the control node is adapted to perform the method for allocating resource elements to a control channel. According to one aspect, a method for operating a receiving node is provided comprising the step: receiving a control channel in resource elements allocated according to the method for allocating resource elements to a control channel. The method may further comprise the step: receiving the bitmap from a control node, the bitmap configuring the control channel. The method may further comprise the step: searching for the control channel according the configuration in the bitmap.

According to one aspect, a receiving node is provided, which is adapted to receive a control channel in the allocated resource elements from the control node. The receiving node may be further adapted to receive a bitmap configuring a control channel from a control node. The method may further comprise the step: searching for the control channel according the configuration in the bitmap.

According to one aspect of particular embodiments a computer program product is provided, comprising software code portions for performing the steps of the method for allocating resource elements for control signaling. Further aspects and details on proposed solutions are found below.

FIG. 8 shows a resource block 30 having on a time axis 31 a number of 14 OFDM symbols and on a frequency axis 32 a number of 12 subcarriers resulting in 12*14=168 resource elements. The resource elements having index D, M, R, S are assigned to a demodulation resource signal. The resource elements having index 1 are assigned to a first subset 33 of resource elements, the resource elements having index 2 are assigned to a second subset 34 of resource elements and so on.

A mCCE is an example of a subset of all resource elements part of a resource block. The subset may be defined in a way that certain properties are achieved, e.g. improved frequency diversity or other gains related to frequency selective scheduling. The resource elements which are part of a subset of resource elements are preferably distributed in a way that frequency selectivity is optimized.

Maximum flexibility can be reached by configuring the ePDCCH control region without any restriction. Since the smallest addressable unit in the frequency domain is a mCCE, each mCCE should be individually configurable. In order to do so, a bitmap can be used. The size of the bitmap equals the number of mCCE in the system bandwidth. Having 100 RBs in a 20 MHz carrier and 8 mCCEs per RB the bitmap has a size of 800 bit. A "1" in that bitmap configures the corresponding mCCE for the ePDCCH control region, while a "0" does not. Like that each mCCE can be configured individually.

As an example, FIG. 9 shows ePDCCH configuration indicating mCCEs upon which the UE should determine the ePDCCH search space. A transmission resource 40 is structured in a similar way as described with respect to FIG. 2. The transmission resource 40 comprises a subframe 41, structured into a first slot 42 and a second slot, the firs slot comprises a first part 45 and a second part 48. A subset 49 of resource elements comprises several resource elements which are distributed on a resource block pair having resource block index 1. As indicated different distributions are foreseen. The resource elements which are part of a certain subset of resource elements may also be part of resource blocks having different frequency domain indices. In FIG. 9 however the subset 49 of resource elements refers to mCCE 1 of RB 1, subset 44 of resource elements refers to mCCE 2 of RB 5 and subset 46 of resource elements refers to mCCE 3 of RB 6 are indicated. FIG. 9 gives an example of a transmission resource comprising a first number of resource blocks comprising a second number of subsets of resource elements. In one case all resource elements of one resource block may form a subset of resource elements. In this case indicating to the subset and indicating to the resource block comprises the same resource elements.

An aggregation level determines the number of mCCEs an ePDCCH spans across. Aggregation level 1 means that the control channel spans over one mCCE; aggregation level 2 means that the control channel spans over two mCCEs etc.

In order to shrink the bitmap, one could indicate to blocks of mCCEs, where the block size is configured as well. Like that the eNB (control node) could configure the block size to 2 mCCEs and flexibly allocate 800 mCCEs with a 400-bit bitmap. Preferably, the block size should be a factor used for the ePDCCH aggregation levels, e.g., 1, 2, 4 or 8 mCCEs. In other words, multiple mCCEs are put together to one block. The mCCEs in one block are configured and addressed together. Thus the bitmap refers to the blocks instead of the mCCEs. In this way the size of the bitmap used for configuration of the control channel is reduced.

Figure 10:
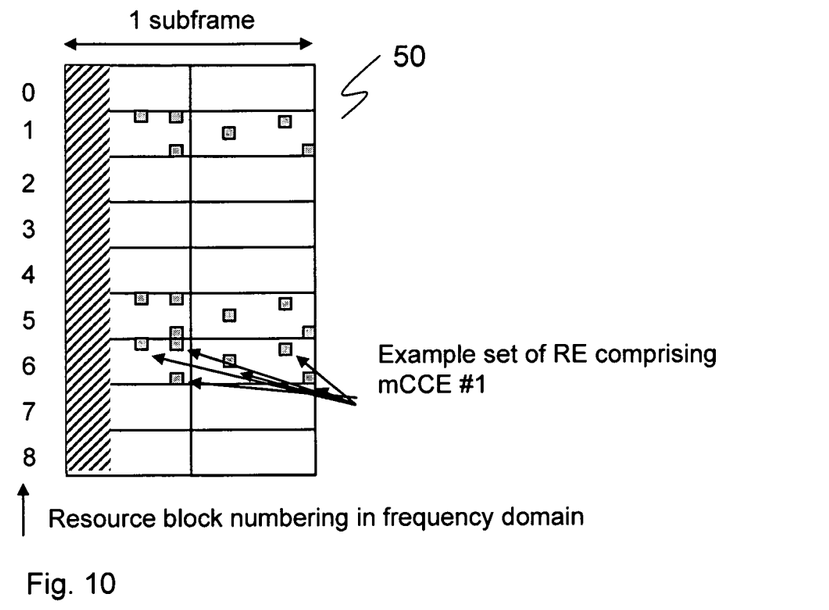

The size of the bitmap can be reduced by configuring the mCCE index separately. The mCCE index is valid for each configured RB. Then the bitmap only indicates the configured RBs. Having 100 RBs in a 20MHz carrier the bitmap has a size of 100 bit. If a single mCCE index is configured another 3 bit are required. FIG. 10 shows an example ePDCCH control region where indication points to RB 1, 5 and 6 while the mCCE index is set to 1. Note that the resource elements assigned to mCCE with index 1 correspond to each other in the selected resource blocks 1, 5 and 6. A transmission resource 50 is structured in terms of first slot, second slot, first part, second part and resource block numbering as the transmission resource in FIG. 9.

Figure 11:
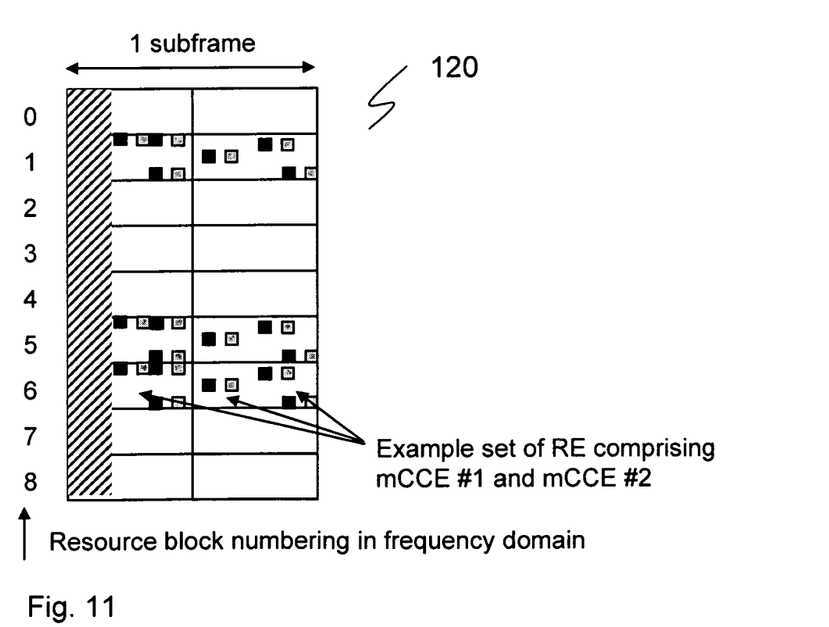
Figure 12:
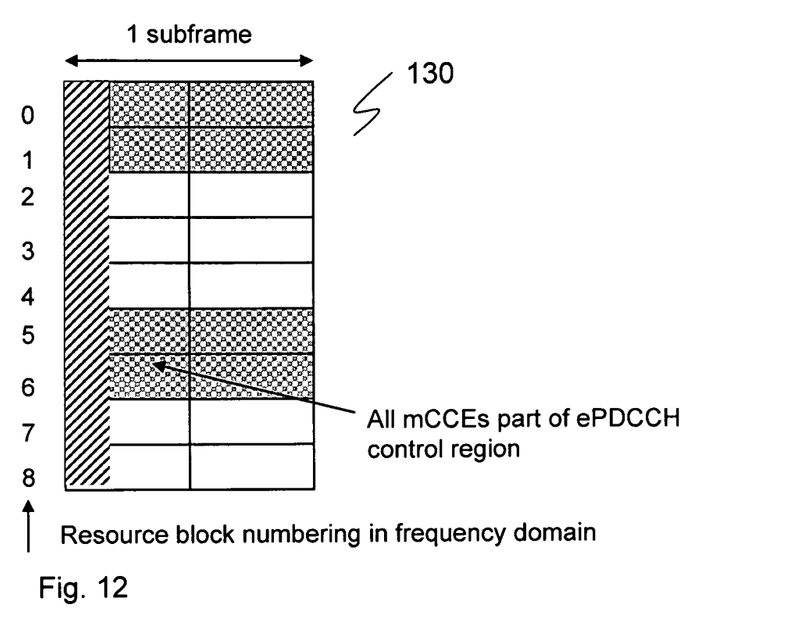
Figure 13:
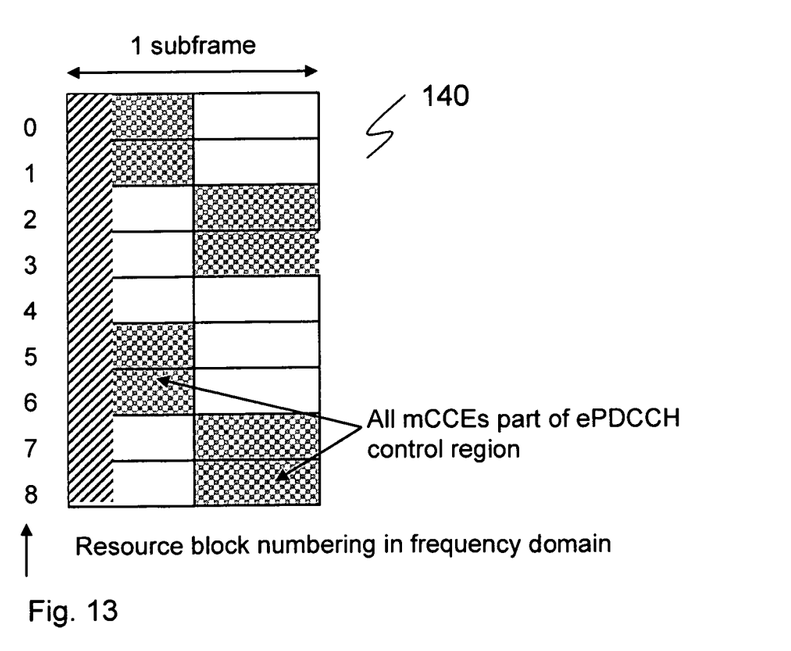

FIG. 11 depicts a transmission resource 120. FIG. 12 depicts a transmission resource 130. FIG. 13 depicts a transmission resource 140. The transmission resources 120, 130 and 140 are structured in a similar way as the transmission resource in FIG. 9. FIGS. 11, 12 and 13 depict different indications of resource elements to be allocated to a control channel.

If, instead of a single mCCE index, a set of mCCE indexes is configured, up to 8 bit are required assuming there are 8 mCCEs per RB. FIG. 11 shows an example ePDCCH control region where indication points to RB 1, 5 and 6 while the mCCE indexes are set to 1 and 2, i.e. mCCE index 1 and 2 are considered.

In an extreme case, all mCCEs of the configured RBs could be considered. Then the bitmap only indicates the configured RBs. RB pairs could be composed of localized RBs, where two RBs of the same subframe form a pair (see FIG. 12) or of distributed RBs where two RBs of different subframes form a pair (see FIG. 13). In FIG. 12, an indication points to RBs 0, 1, 5 and 6, all mCCEs within those RBs are considered; a localised RB pair is used. In FIG. 13, an indication points to RBs 0, 1, 5 and 6; all mCCEs within those RBs are considered; distributed RB pairs are used.

Alternatively, instead of being configured by the control node or instead of being fixed to a certain number by the specification, the mCCE index could be derived by each UE individually based on a UE-specific parameter. For instance, the mCCE index could be calculated based on the C-RNTI (Cell-Radio Network Temporary Identifier) by a modulo 8 operation.

As a further embodiment for ePDCCH a bitmap (probably with a separately configured set of mCCEs) can be used to individually configure the control region per aggregation level. This would involve as many bitmaps as we configure ePDCCH aggregation levels. Up to 3GPP LTE Release 10, aggregation levels of 1, 2, 4 and 8 RBs are discussed. Higher aggregation levels, e.g. 16 may be possible for the ePDCCH.

Another possibility to reduce the size of the bitmap (applicable either per aggregation level or to a common signalling valid for all aggregation levels) is to combine it with a starting position. For example, instead of 800 bits one could use 50 bits together with a starting mCCE index that locates the 50 mCCEs pointed to by the bitmap somewhere in the 800 mCCE bandwidth. This reduces the bitmap size at the cost of reduced flexibility. Another possibility could be to let the reduced bitmap point to every second or every fourth mCCE, etc, thereby reducing the size with a factor of two or four. The two methods could also be combined, e.g. two small bitmaps, each with a starting point in the overall bandwidth. In this case, restrictions on the starting point can be exploited to further reduce the number of bits, e.g. by defining the starting position of the second bitmap relative to the first bitmap, or to relate the location of the second bitmap to the end of the overall bandwidth (i.e. not relative to the first mCCE but to the last mCCE). This approach can be generalized to more than two groups of bitmaps.

The proposed scheme allows maximum flexibility when configuring mCCEs for the ePDCCH control region. By that the ePDCCH control region can be configured to meet different goals, such as frequency diversity or gains from frequency selective scheduling.

Figure 14:
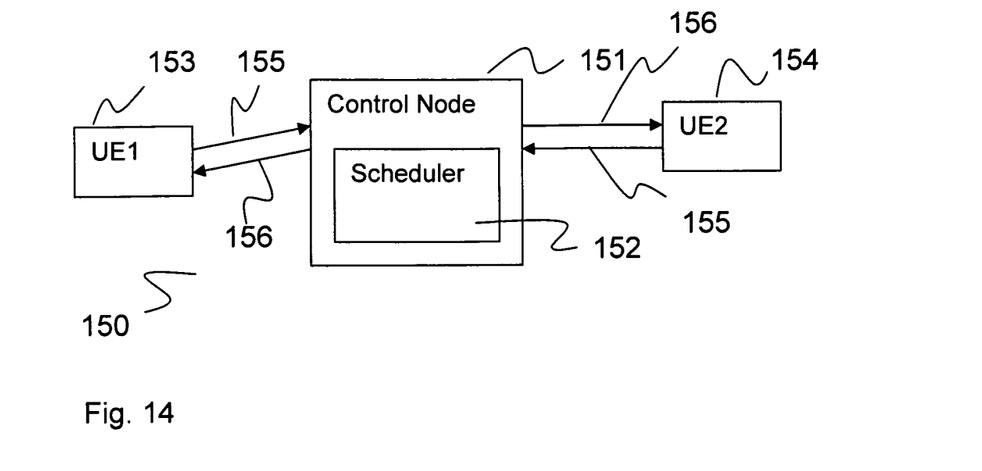
FIG. 14 shows—as an example—a general setup of a system in which particular embodiments can be implemented.

FIG. 14 shows—as an example—a general setup of a system in which particular embodiments can be implemented. FIG. 14 shows a radio communication system 150 comprising a control node 151 (eNB) with a scheduler 152 and a first receiving node 153 (UE1) and a second receiving node 154 (UE2). Each of the control node and the receiving nodes comprises a transmitter and a receiver. The control node and the receiving nodes are connected via a wireless interface. The arrows indicate possible uplink communications 155 and downlink communications 156.

Figure 15:
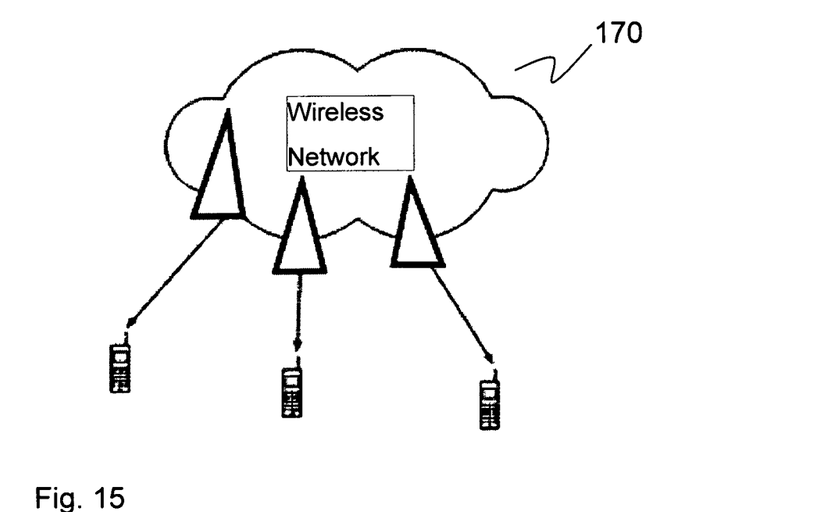
FIG. 15 shows—as an example—a communication system.

Although the described solutions may be implemented in any appropriate type of telecommunication system supporting any suitable communication standards and using any suitable components, particular embodiments of the described solutions may be implemented in an LTE network, such as that illustrated in FIG. 15.

As shown in FIG. 15, the example network 170 may include one or more instances of user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments represent devices such as the example UE illustrated in greater detail by FIG. 16. Similarly, although the illustrated base stations may represent network nodes that include any suitable combination of hardware and/or software, these base stations may, in particular embodiments, represent devices such as the example base station illustrated in greater detail by FIG. 17.

Figure 16:
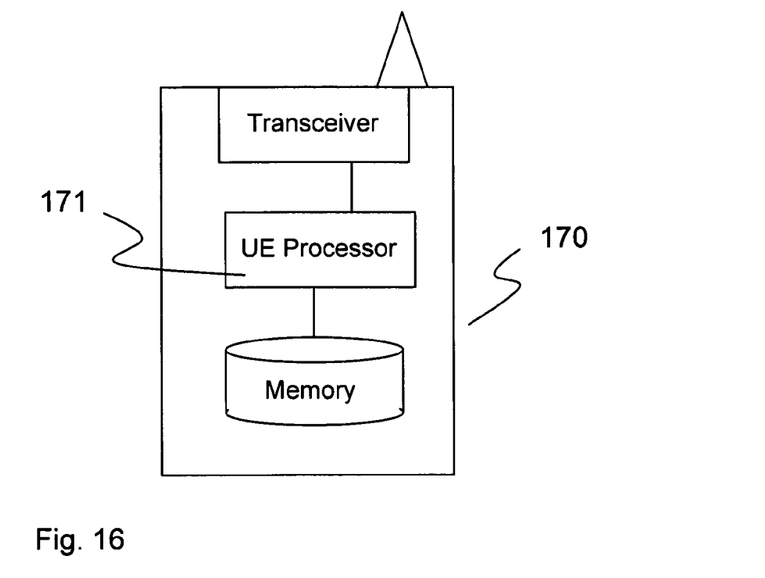
FIG. 16 shows—as an example—a User Equipment (UE).

As shown in FIG. 16, the example UE includes a processor, a memory, a transceiver, and an antenna. In particular embodiments, some or all of the functionality described above as being provided by mobile communication devices or other forms of UE may be provided by the UE processor executing instructions stored on a computer-readable medium, such as the memory shown in FIG. 16. Alternative embodiments of the UE may include additional components beyond those shown in FIG. 16 that may be responsible for providing certain aspects of the UE's functionality, including any of the functionality described above and/or any functionality that may support the solution described above.

As an example, FIG. 16 shows a receiving node 170 for a wireless communication network and for allocating resource elements of a transmission resource to a control channel. It comprises a processor entity 171 for obtaining a bitmap for configuration of the transmission resource, for allocating the at least one identified subset of resource elements to the control channel, and for searching for control data on the at least one subset of resource elements allocated to the control channel.

Figure 17:
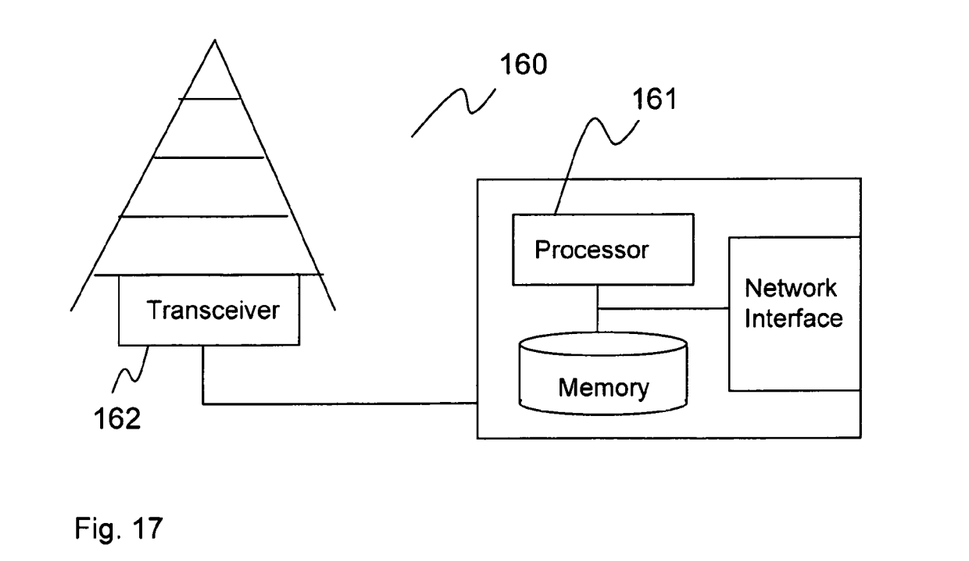
FIG. 17 shows—as an example—a base station.

As shown in FIG. 17, the example base station includes a processor, a memory, a transceiver, and an antenna. In particular embodiments, some or all of the functionality described above as being provided by a mobile base station, a base station controller, a node B, an enhanced node B, and/or any other type of mobile communications node may be provided by the base station processor executing instructions stored on a computer-readable medium, such as the memory shown in FIG. 15. Alternative embodiments of the base station may include additional components responsible for providing additional functionality, including any of the functionality identified above and/or any functionality that may support the solution described above.

As an example, FIG. 17 shows a control node 160 for a wireless communication network for allocating resource elements of a transmission resource to a control channel. The control node comprises a scheduler entity 161 for obtaining a bitmap for configuration of the transmission resource and for allocating the at least one identified subset of resource elements to the control channel. The control node 160 also comprises a transmitter 162 for transmitting control data on the at least one subset of resource elements allocated to the control channel to a receiving node.

Figure 18:
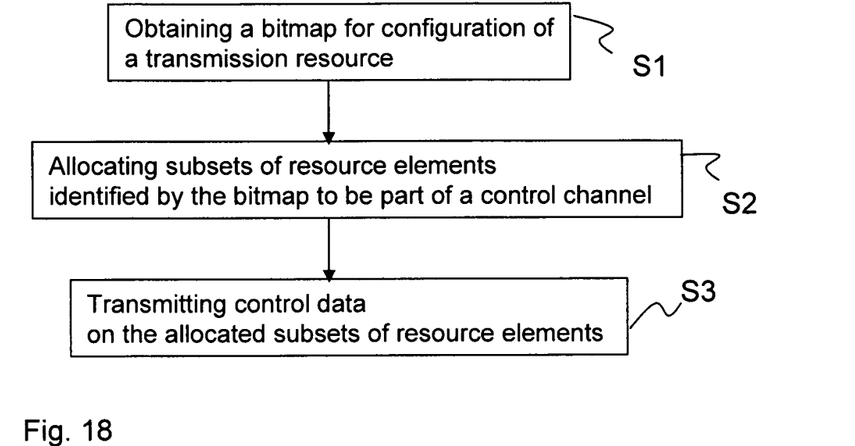
FIG. 18 shows a flowchart of a method in a control node of a wireless communication network for allocating resource elements of a transmission resource to a control channel.

FIG. 18 shows a flowchart of a method in a control node of a wireless communication network for allocating resource elements of a transmission resource to a control channel. In a step S1 the control node obtains a bitmap for configuration of a transmission resource. In a step S2 subsets of resource elements identified by the bitmap to be part of the control channel are allocated to the control channel. In step S3 the control node transmits control data on the allocated subsets of resource elements to a receiving node. The transmission resource comprises a first number of resource blocks each comprising one or a plurality of subsets of resource elements. One resource block may also be represented by a set of resource blocks or a pair of resource blocks.

Figure 19:
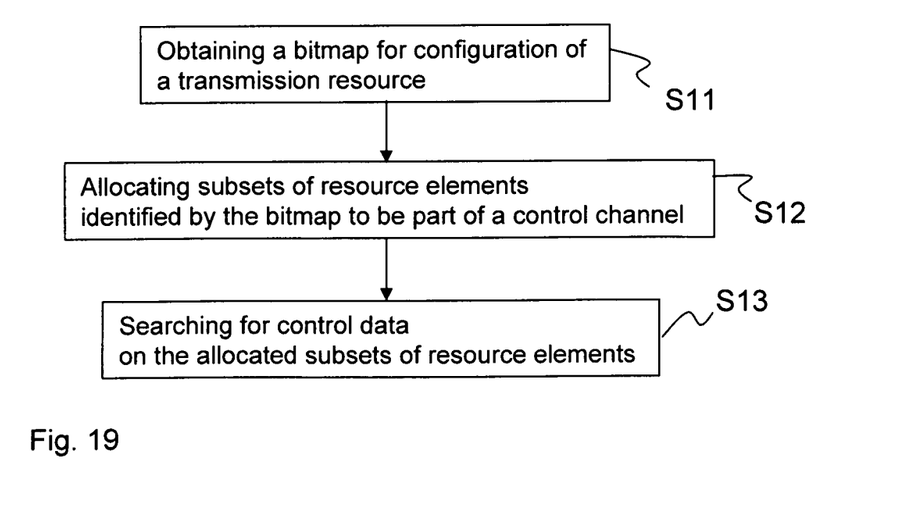
FIG. 19 shows a flowchart of a method in a receiving node of a wireless communication network for allocating resource elements of a transmission resource to a control channel.

FIG. 19 shows a flowchart of a method in a receiving node of a wireless communication network for allocating resource elements of a transmission resource to a control channel. In a step S11 the receiving node obtains a bitmap for configuration of a transmission resource. In a step S12 subsets of resource elements identified by the bitmap are allocated to the control channel. In step S13 the receiving node searches for control data on the allocated subsets of resource elements to a receiving node. Searching may comprise starting to decode the data received in the subsets of resource elements allocated to the control channel.

The invention claimed is:

1. A method in a control node of a wireless communication network for allocating resource elements of a transmission resource to a control channel, wherein the transmission resource comprises a first number of resource blocks, each resource block comprising one or a plurality of subsets of resource elements, the method comprising:
    obtaining a bitmap for configuration of the transmission resource, wherein the bitmap is configured to identify at least one subset of resource elements within the transmission resource;
    allocating the at least one identified subset of resource elements to the control channel;
    transmitting the bitmap to a receiving node; and
    transmitting control data on the at least one subset of resource elements allocated to the control channel to the receiving node;
wherein obtaining the bitmap for configuration of the transmission resource comprises:
    obtaining separate bitmaps for configuration of the transmission resource for multiple aggregation levels; and
    selecting one bitmap for configuration of the transmission resource according to a configured aggregation level.

2. The method of claim 1, further comprising:
    identifying individually each subset of resource elements of the transmission resource individually to be part of the control channel or not, based on the selected bitmap.

3. The method of claim 1, wherein the selected bitmap relates a separate bit to each subset of resource elements of the transmission resource.

4. The method of claim 1, further comprising:
grouping the subsets of resource elements in blocks of subsets of resource elements, wherein one block of subsets comprises two or more subsets; and
identifying each block of subsets individually to be part of the control channel or not, based on the selected bitmap.

5. The method of claim 4, wherein the selected bitmap relates a separate bit to each block of subsets of resource elements of the transmission resource.

6. The method of claim 1, further comprising:
identifying each of the resource blocks of the transmission resource individually to be used for the control channel or not, based on the selected bitmap;
indicating one or more subsets of one resource block; and
identifying the one or more indicated subsets to be part of the control channel or not in every resource block identified as to be used for the control channel.

7. The method of claim 1, further comprising:
setting a starting position within the selected bitmap;
reusing the selected bitmap, based on the starting position, to configure the entire transmission resource.

8. The method of claim 1, wherein the selected bitmap configures a predefined subset of the number of resource blocks or the plurality of subsets of resource elements of the transmission resource.

9. The method of claim 1, wherein an allocation of resource elements to at least one of the subsets of resource elements is based on optimizing a transmission property.

10. A method in a receiving node of a wireless communication network for allocating resource elements of a transmission resource to a control channel, wherein the transmission resource comprises a first number of resource blocks, each resource block comprising one or a plurality of subsets of resource elements, the method comprising:
receiving, from a control node, a bitmap for configuration of the transmission resource, wherein the bitmap is configured to identify at least one subset of resource elements within the transmission resource;
allocating the at least one identified subset of resource elements to the control channel; and
searching for control data on the at least one subset of resource elements allocated to the control channel;
wherein the method further comprises:
obtaining separate bitmaps for configuration of the transmission resource for multiple aggregation levels; and
selecting one bitmap for configuration of the transmission resource according to a configured aggregation level.

11. The method of claim 10, further comprising:
identifying individually each subset of resource elements of the transmission resource to be part of the control channel or not, based on the selected bitmap.

12. The method of claim 10, wherein the selected bitmap relates a separate bit to each subset of resource elements of the transmission resource.

13. The method of claim 10, further comprising:
grouping the subsets of resource elements in blocks of subsets of resource elements, wherein one block of subsets comprises two or more subsets; and
identifying each block of subsets individually to be part of the control channel or not, based on the selected bitmap.

14. The method of claim 13, wherein the selected bitmap relates a separate bit to each block of subsets of resource elements of the transmission resource.

15. The method of claim 10, further comprising:
identifying each of the resource blocks of the transmission resource individually to be used for the control channel or not, based on the selected bitmap;
indicating one or more subsets of one resource block; and
identifying the one or more indicated subsets to be part of the control channel or not in every resource block identified as to be used for the control channel.

16. The method of claim 10, further comprising:
setting a starting position within the selected bitmap; and
reusing the selected bitmap based on the starting position to configure the entire transmission resource.

17. The method of claim 10, wherein the selected bitmap configures a predefined subset of the number of resource blocks or the plurality of subsets of resource elements of the transmission resource.

18. The method of claim 10, wherein an allocation of resource elements to at least one of the subsets of resource elements is based on optimizing a transmission property.

19. A control node for a wireless communication network and for allocating resource elements of a transmission resource to a control channel, wherein the transmission resource comprises a first number of resource blocks, each resource block comprising one or a plurality of subsets of resource elements, the control node comprising:
a transceiver circuit configured to transmit data to a receiving node; and
a processor circuit configured to:
obtain a bitmap for configuration of the transmission resource, wherein the bitmap is configured to identify at least one subset of resource elements within the transmission resource;
allocate the at least one identified subset of resource elements to the control channel;
transmit control data, using the transceiver circuit, on the at least one subset of resource elements allocated to the control channel to a receiving node; and
transmit the bitmap to the receiving node, using the transmitter circuit;
wherein the processor circuit is configured to obtain the bitmap for configuration of the transmission resource by:
obtaining separate bitmaps for configuration of the transmission resource for multiple aggregation levels; and
selecting one bitmap for configuration of the transmission resource according to a configured aggregation level.

20. A receiving node for a wireless communication network, configured to allocate resource elements of a transmission resource to a control channel, wherein the transmission resource comprises a first number of resource blocks, each resource block comprising one or a plurality of subsets of resource elements, the receiving node comprising:
a transceiver circuit; and
a processor circuit configured to:
receive, via the transceiver circuit, a bitmap for configuration of the transmission resource, wherein the bitmap is configured to identify at least one subset of resource elements within the transmission resource;
allocate the at least one identified subset of resource elements to the control channel; and
search for control data on the at least one subset of resource elements allocated to the control channel;
wherein the processor circuit is further configured to:
obtain separate bitmaps for configuration of the transmission resource for multiple aggregation levels; and
select one bitmap for configuration of the transmission resource according to a configured aggregation level.

* * * * *